Jan. 18, 1955  N. J. KITTEN ET AL  2,699,867
RIPE COTTON BOLL SEPARATOR
Filed March 23, 1950  5 Sheets-Sheet 2

Nestor J. Kitten
John B. Kitten
INVENTORS

BY
Attorneys

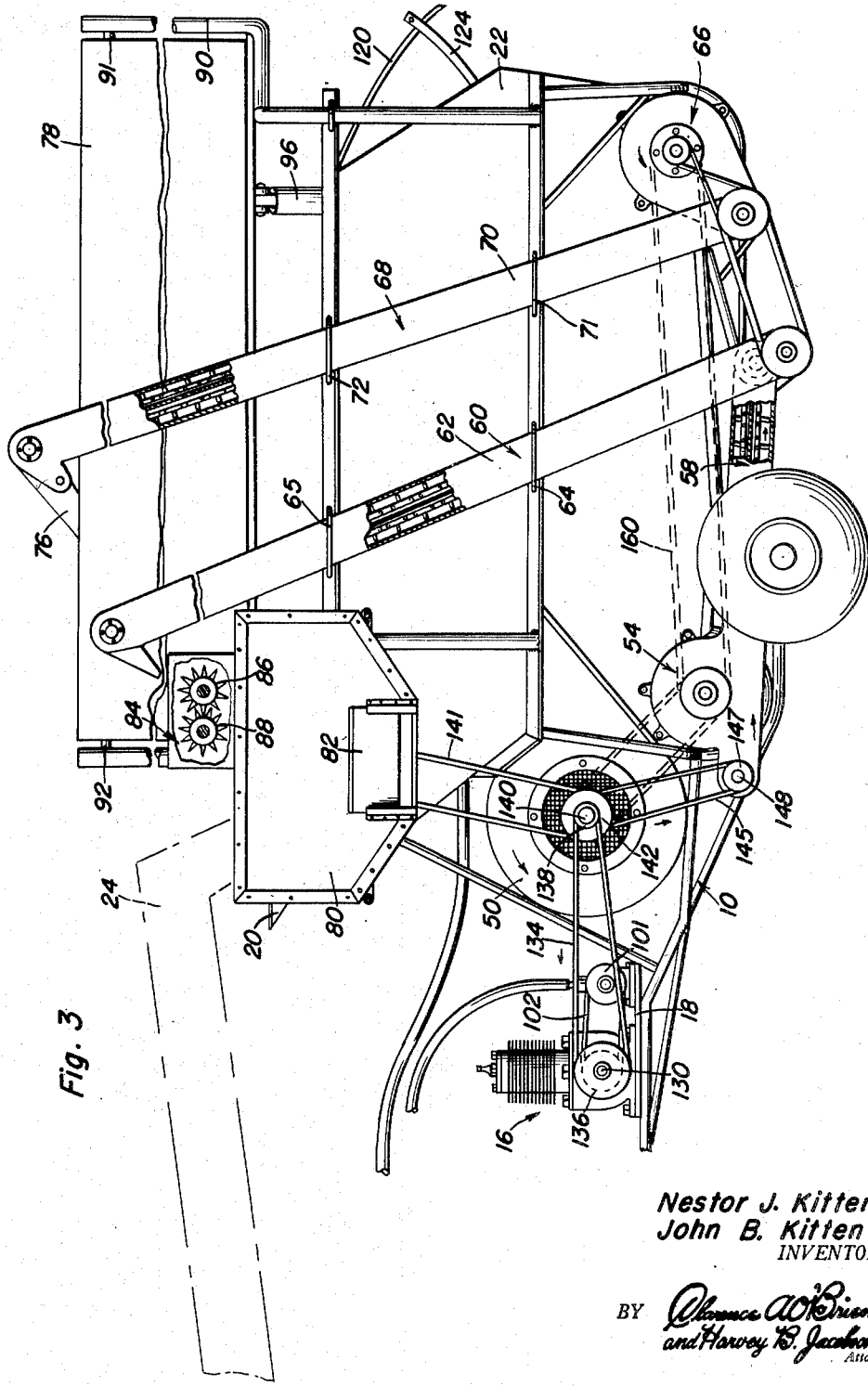

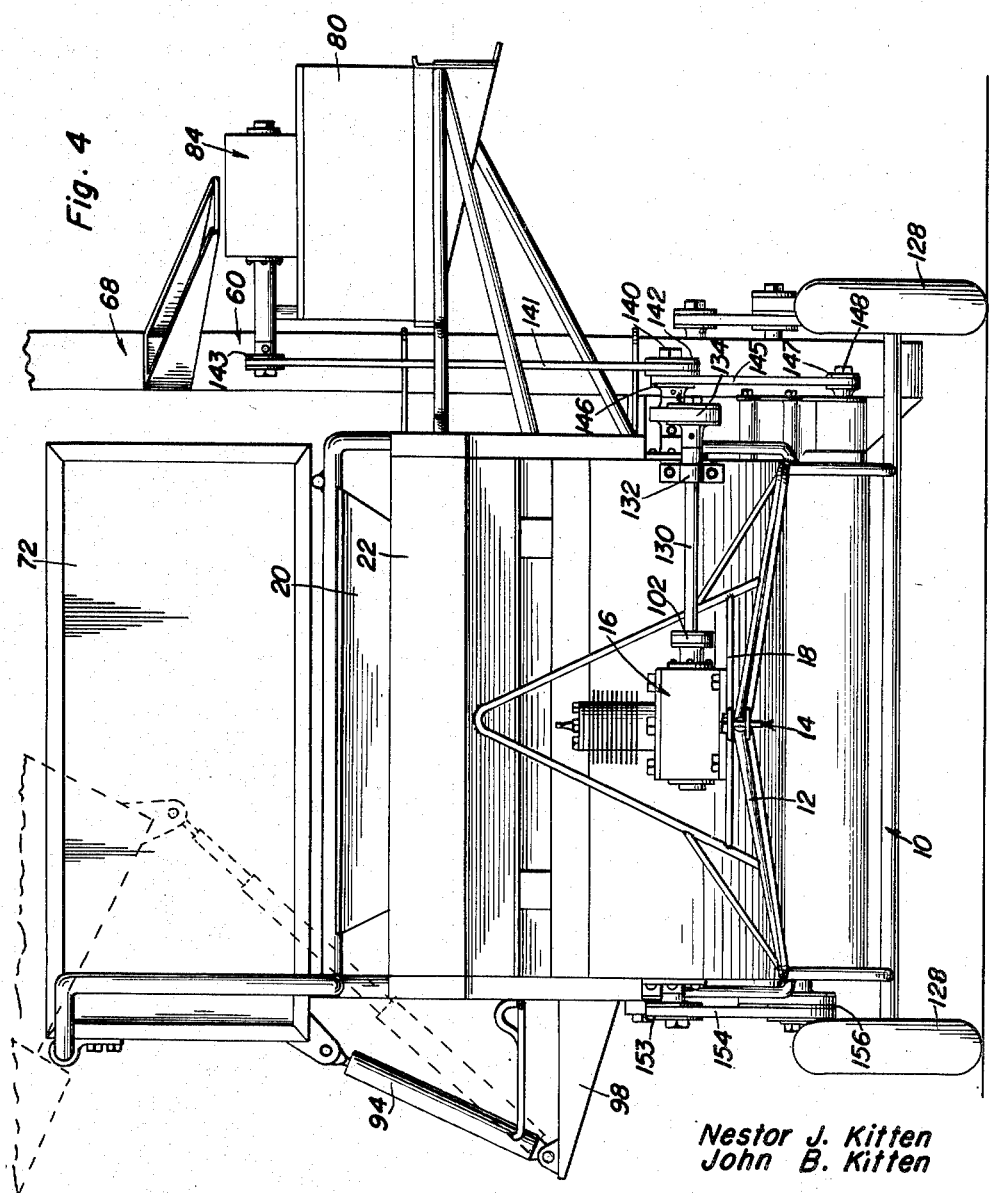

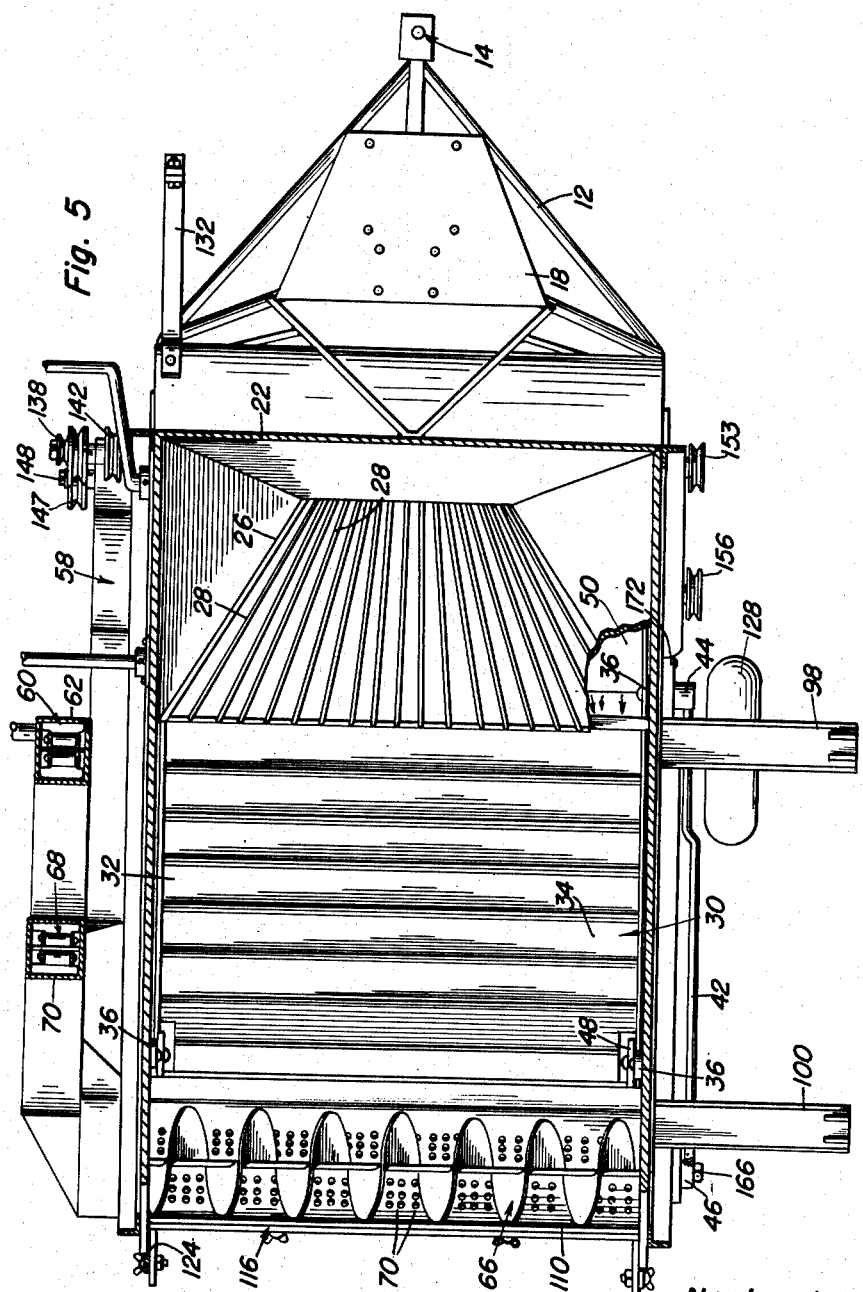

United States Patent Office 2,699,867
Patented Jan. 18, 1955

2,699,867
RIPE COTTON BOLL SEPARATOR

Nestor J. Kitten and John B. Kitten, Slaton, Tex.

Application March 23, 1950, Serial No. 151,438

4 Claims. (Cl. 209—21)

This invention relates to improvements in a harvesting device for cotton which is adapted to separate refuse such as leaves from open and closed bolls of cotton and also to separate the closed bolls from the open bolls.

It is another object of this invention to thereafter crush the green or closed bolls and deposit them for further opening whereby they may be again collected.

A further object of this invention is to separate the components as above set forth by means of an air blast which is directed through a cleaning unit which is adapted to be shaken, said cleaning unit including an upper adjustable sieve and an intermediate classifying screen, the screen being disposed above a bottom tray or pan, whereby the air blast urges the open bolls and light refuse to the rear of the device so that the light refuse may be blown through a passageway provided for this purpose and so that the open bolls may be gathered and conveyed to a receptacle for disposition into a truck or into any other receptacle.

Ancillary objects and features will become apparent in following the description of the illustrated form of the invention.

In the drawings:

Figure 3 is an elevational view of the structure, illustrating the side opposite from that shown in Figure 1, and Figure 4 is a front view of the device shown in Figure 1; and Figure 5 is a view taken substantially along the line 5—5 of Figure 2 and in the direction of the arrows.

Figure 1:
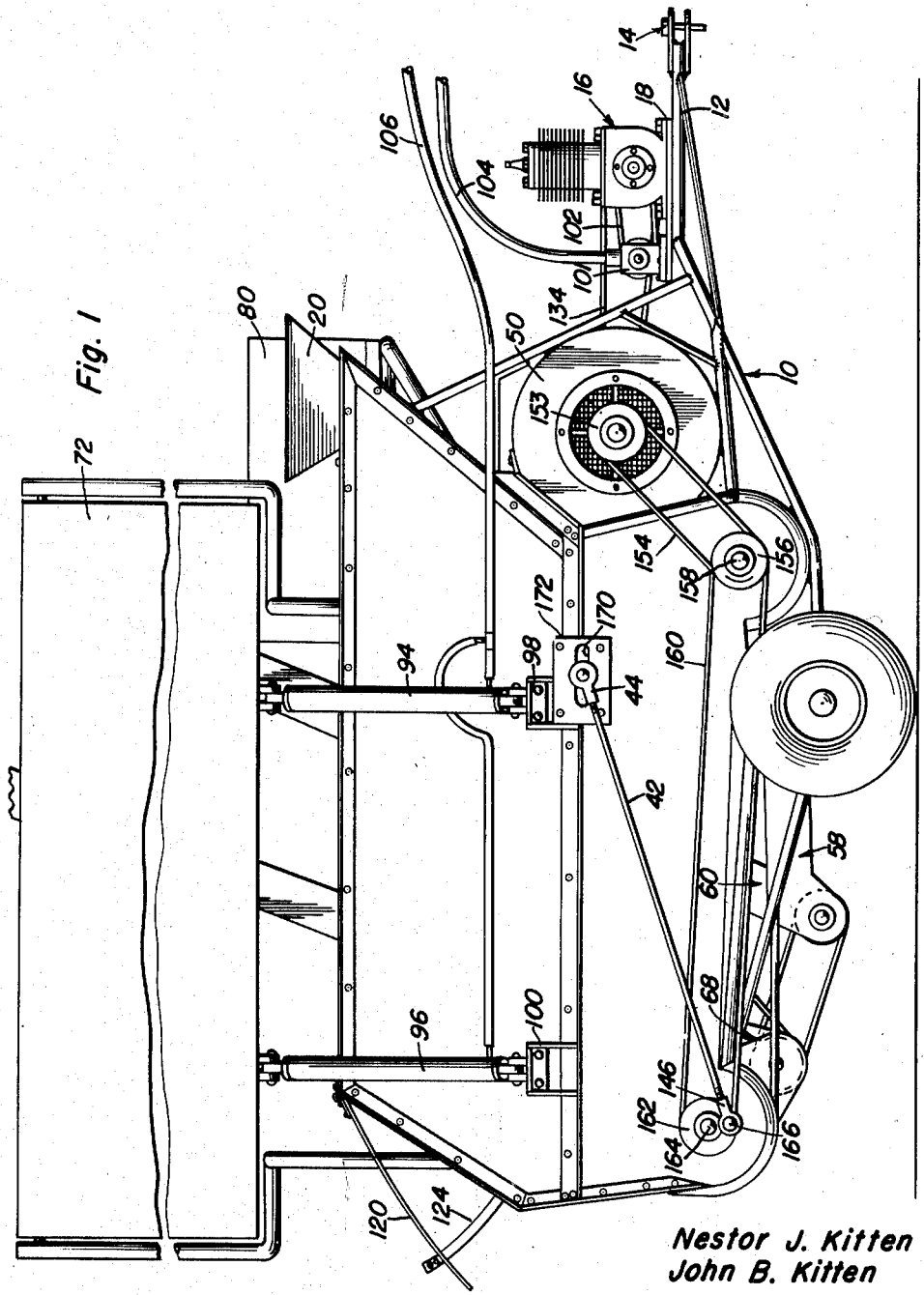
Figure 1 is an elevational view of the device.

In the instant invention there is provided a chassis 10 composed of sufficient structural framing elements and members, either welded or otherwise firmly fastened together, in order to form the carriage for the various components forming the invention. A tongue 12 having a coupling pin assembly 14 is secured to the front end of the chassis and is adapted to attach to any suitable prime mover, as a tractor, stripper, or the like. A conventional engine 16 is disposed on a platform 18, adjacent the tongue 12 and said engine is employed as the motive force for the conveyors, blower and augers which are as component parts of the invention.

Figure 2:
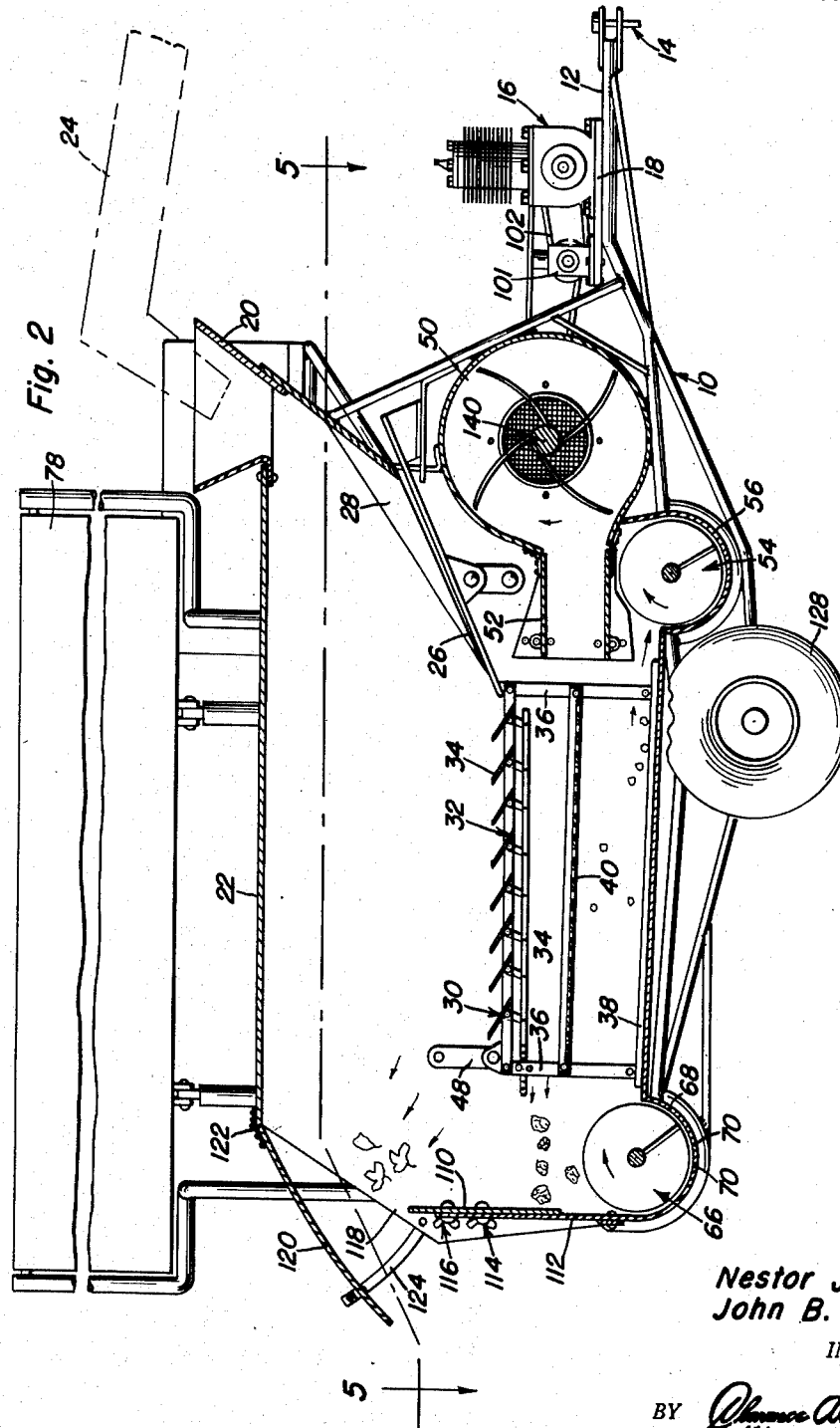
Figure 2 is a longitudinal sectional view of the device of Figure 1.

A receiving hopper 20 is disposed at the top of the casing 22, said casing being mounted on the structure or framework of the chassis. The receiving hopper is adapted to funnel the cotton and other refuse which is collected by a conventional stripper, the discharge nozzle 24 of which is shown in Figure 2, so that the green bolls, open bolls and refuse which is of necessity picked up by the stripper, may be deposited in the casing.

A spreader pan 26 is mounted in the casing and below the receiving hopper, this spreader pan being disposed at an angle with respect to the horizontal and having its discharge end toward the center of the casing 22. A number of fins 28 diverge toward the discharge end of the spreader pan, which end is in communication with a cleaning unit 30.

The cleaning unit consists of an upper sieve 32 which is adjustable, that is, it is provided with a number of louvers or fins 34 which are set adjustably to various positions with respect to each other. Any conventional means for adjusting the louvers may be employed, this being a matter of choice. Four vertical posts 36 are pivoted at their lower ends to the pan 38 which is disposed on the bottom of the casing 22. The vertical posts or links support an intermediate classifying screen 40 which is pivoted to all of the posts. The holes in the screen 40 are round and are of a predetermined size.

Means for shaking the cleaning unit is operatively connected with the cleaning unit and includes a pitman 42 (Figure 1) which is threaded to a coupling 44 at one end and threaded to a coupling 46 at the other end. By turning the pitman 42 in one direction or another, the effective length thereof may be extended due to the threads at the ends thereof. By this medium, the stroke of the pitman is adjusted.

The coupling 44 is provided with a crank 48 (Figure 2) which is pivoted to a part of the cleaning unit, whereby upon reciprocation of the pitman 42, the cleaning unit is shaken.

A conventional blower or air impeller 50 is mounted on the chassis and has a nozzle 52 at the forward end thereof to direct an air blast over the cleaning unit in the region thereof below the adjustable sieve 32 and above the pan 38.

A green boll collection auger or conveyor 54 is mounted in a trough 56 in the casing and extends transverse of the chassis. This green boll collection auger 54 communicates with an endless conveyor 58 which extends longitudinally of the axis of the chassis and which, in turn, communicates with a green boll elevator conveyor 60 in a housing 62, which is mounted by means of brackets 64 and 65 on the exterior of the casing 22.

There is an open boll auger or conveyor 66 at the rear end of the casing which is mounted in a trough 68 having a number of apertures 70 in the bottom thereof. These apertures are to allow some of the refuse which is retained with the open bolls to drop from the casing. The auger 66 extends transversely of the chassis and communicates with an open boll elevator or conveyor 68 which is disposed in a housing 70. This housing is secured to the exterior surface of the casing 22 by means of brackets 71 and 72, which are affixed to portions of the frame or chassis. The upper end of the elevator 68, which is of the endless conveyor type, has a pivotal spout 76 thereon which is capable of being moved by contact therewith, as by engagement of the cotton hopper 78 therewith, as the cotton hopper is pivoted to unload the same.

A green boll hopper 80 is mounted on supports which form a part of the structural framing of the machine. A discharge door 82 is disposed at the lower part of the green boll hopper in order to allow the contents of the hopper to be discharged when it is found desirable or necessary. A green boll crusher 84 is disposed on the top of the green boll hopper and has a pair of toothed crusher members 86 and 88 therein. The elevator 60 communicates with the green boll crusher so that the green bolls are emptied into the crusher and crushed. Thereafter they fall by gravity into the green boll hopper and remain there until such time that the door or gate 82 is manually operated to allow them to fall to the ground or to allow them to fall into a receptacle of any one's choice.

The cotton hopper 78 is mounted on a cradle 90 by means of trunnions 91 and 92, which are carried by the cotton hopper 78. Hydraulically operated piston-cylinder assemblies 94 and 96 are pivoted at their upper ends to the cotton hopper 78 and pivoted at their lower ends to the brackets 98 and 100 which extend outwardly or laterally from the chassis of the machine.

The engine 16 is connected by means of the belts 102 to a pump 104 which is mounted on the platform 18. This pump has a line 104 extending therefrom which terminates in a reservoir. When the engine 16 is operated, the pump 102 is correspondingly actuated. This places the reservoir under pressure so that by means of a conventional control valve, fluid may pass into the conduit 106 which is operatively connected with the cylinder-piston constructions 94 and 96, respectively. This causes the open boll cotton hopper 78 to be pivotally operated about the trunnions 91 and 92 as an axis so as to discharge the contents thereof.

A vertically adjustable end gate 110 is mounted on the back wall 112 of the casing. The vertically adjustable gate 110 may be provided with slots or the back wall 112 provided with slots so that the screw and bolt assemblies 114 and 116 may be passed therethrough to allow selected vertical adjustment of the gate. This controls the refuse passageway 118 as to size, which is arranged immediately above the upper edge of the gate 110.

A baffle 120 which is slightly arcuate in form is hinged as at 122 to the top part of the casing 22. It is held in the hinged position by means of arms 124 which are pivoted to the casing 22 and which are secured, as by means of a bolt, passing through a selected one of the number of apertures in the arms 124, to the hinged baffle 120.

The device is adapted to be secured to any farm machinery by means of the coupling pin 14, which is illustrative of any conventional type of hitch. The device is mounted on wheels 128 so that it may be pulled easily through the field.

Reference is now made to the drive mechanism for the various components of the machine. The shaft 130 which is partially supported by a hanger 132 (Figure 5) extends from the motor or engine 16. This shaft has a belt 134 entrained around a pulley 136, which is fixed to said shaft (Figure 3); said belt also extending around a pulley 138. The pulley 138 is secured to the blower shaft 140, the blower being adapted to direct an air blast over the cleaning unit, as previously described. Accordingly, operation of the engine 16 causes direct operation (through the belt and pulley assembly) of the blower 50.

Extending upwardly is a belt 141 which is entrained around a pulley 142, this pulley being fixed to the impeller shaft 140. The belt 141 is entrained around a pulley 143 which is secured to the shaft for operating toothed grinders 86 and 88 of the green boll crusher 84. A belt 145 is entrained around the pulley 146, the last-named pulley being fixed to the impeller shaft 140. The belt is also entrained around a pulley 147 which is secured to the shaft 148. The shaft 148 forms a part of the endless conveyor of the green boll conveyor 58 (Figure 3).

The impeller shaft 140 extends entirely through the casing 22 and has a pulley 153 on the other side thereof (Figure 1). This pulley has a belt 154 entrained therearound, which is also entrained around one part of a double pulley 156. Accordingly, when the air impeller 50 is operated, the pulley 156 which is fixed to the shaft 158 is caused to operate. The pulley 153 forms a part of the green boll auger or conveyor 54, whereby operation of this particular conveyor is occasioned. The other part of the double pulley 156 has a belt 160 entrained therearound, which is also entrained around a pulley 162. The pulley 162 is fixed to the auger shaft 164, so that when the auger 54 is operated, the auger 66 is also actuated and through the belting 165 elevators 60 and 68 are operated. Said shaft 154 is employed for imparting reciprocatory movement to the pitman 42. The coupling 46 is secured by means of a pivotal connection 166 to the pulley 162, whereby upon operation of the auger 66, the pitman 42 is caused to reciprocate so that the coupling 44 moves forwardly and backwardly in the slot 170 which is formed in the bearing plate 172. This bearing plate is fixed by an suitable means, to the outside of the casing 22 or to a part of the framing of the machine. The previously described crank 43 is secured to the coupling 44 whereby reciprocatory movement of the pitman 42 is imparted to the cleaning unit 30.

In operation the chassis is fixed coupled to a farm machine. After the conventional stripper, employed in cotton gathering is caused to operate, the engine 16 is rendered operative. By virtue of this, the pump 101 is rendered operative. This causes a fluid pressure in a pressure tank so that by valve manipulation, the cylinder-piston constructions 94 and 96 may be operated to tilt the cotton hopper 78 to empty the contents thereof. Assuming that the hopper or receptacle 78 is substantially empty the operation for filling this hopper is as follows:

Green bolls, open bolls and leaves and the like which are gathered by the stripper, are deposited in the receiving hopper 20. All of this material falls on the spreader pan 28 for disposition on the cleaning unit. This cleaning unit is now reciprocating by virtue of the structure previously described. The cleaning unit also has an air blast directed therethrough, and in the particular region set forth. The adjustable sieve allows cotton bolls to pass therethrough and very little of the leaves and the like inasmuch as they are larger than the cotton bolls. The open cotton bolls fall through and are lighter than the green or closed cotton bolls. Accordingly, the air blast is of such intensity that the open cotton bolls are urged backwardly to impinge against the gate 110, once they fall into the open boll collecting conveyor 66. The light material, as the leaves, is for the main part blown through the passageway 118 by the air blast.

The green or heavier bolls are allowed to fall on the pan 38, which is inclined slightly at an angle toward the front of the machine. The bolls roll into the auger 54 for subsequent conveyance by the elevator 60 into the green boll crusher 84. The green boll crusher crushes the green bolls and they are deposited in the green boll hopper 80 for subsequent discharge through the gate 82.

The open bolls after striking the gate 110 or the back part of the casing, fall into the auger 66, to be conveyed by means of the elevator 68 into the cotton hopper 78. Dirt and the like is further separated from the open bolls by passing through the openings 70 in the trough 68 (see Figure 2) prior to disposition of the open bolls into the cotton hopper 78.

Having described the invention, what is claimed as new is:

1. A device for cleaning trash from cotton bolls and for separating ripe cotton bolls from green cotton bolls comprising, an elongated casing having an inlet therein and a bottom wall, means adjacent one end of said casing for conveying green cotton bolls outwardly of the casing, means adjacent the opposite end of the casing for conveying ripe cotton bolls outwardly of the casing, a horizontal shaker sieve movably mounted in said casing and disposed in spaced relation to said bottom wall substantially mid-way between the ripe and green boll conveying means, a classifying screen operatively connected to and disposed below said sieve and in spaced relation to said bottom wall, means for shaking said screen and said sieve, a blower operatively connected to said casing adjacent its forward end thereof and having an air blast discharge port extending above and below said classifying screen and directed toward the rear of said casing, a vertical gate extending transversely of and adjacent the end of said casing opposite to said blower and arranged in alignment with the outlet of the blower and forming a stop for ripe cotton bolls carried along by said air blast, said ripe cotton boll conveying means being disposed below and inwardly of said gate whereby ripe bolls striking said gate will fall therefrom to the ripe boll conveying means, said bottom wall being inclined toward said green boll conveyor whereby green bolls passing through said screen and unaffected by said air blast will roll by gravity to said green boll conveying means, said casing being provided with an opening above said gate to thereby form an exhaust passage for light refuse mingled with the cotton.

2. The combination of claim 1, and a receptacle pivotally carried above said casing to receive the open bolls, and means for pivotally operating said receptacle to empty the contents thereof.

3. The combination of claim 1, said ripe boll conveying means comprising a trough formed in said casing, an auger in said trough, said trough having a plurality of openings therein to permit foreign material mixed with the ripe bolls to fall therethrough.

4. The combination of claim 1, a green cotton boll crusher disposed at the discharge end of said green boll conveying means, a hopper communicating with said crusher to receive crushed green bolls, and a receptacle disposed at the discharge end of said ripe boll conveying means to collect ripe bolls of cotton.

References Cited in the file of this patent

UNITED STATES PATENTS

| Number | Name | Date |
|---|---|---|
| 31,096 | Michael | Jan. 8, 1861 |
| 52,841 | Free | Feb. 27, 1866 |
| 345,285 | Dow | July 13, 1886 |
| 405,018 | Dodd | June 11, 1889 |
| 467,636 | Cook | Jan. 26, 1892 |
| 745,741 | Smith | Dec. 1, 1903 |
| 1,199,599 | Oletzky | Sept. 26, 1916 |
| 1,267,658 | Green | May 28, 1918 |
| 1,638,867 | Melton | Aug. 16, 1927 |
| 1,941,124 | Ziegler | Dec. 26, 1933 |
| 2,240,779 | Hunt | May 6, 1941 |
| 2,395,163 | Carroll | Feb. 19, 1946 |
| 2,399,718 | Baker et al. | May 7, 1946 |
| 2,526,535 | Brown | Oct. 17, 1950 |